(12) United States Patent
Kubo et al.

(10) Patent No.: US 12,504,745 B2
(45) Date of Patent: Dec. 23, 2025

(54) CONTROL DEVICE, SYSTEM, AND ADJUSTMENT METHOD

(71) Applicant: TOYOTA JIDOSHA KABUSHIKI KAISHA, Toyota (JP)

(72) Inventors: Chikage Kubo, Chofu (JP); Kenichi Yamada, Nissin (JP); Yuki Tatsumoto, Seto (JP); Hiromitsu Fujii, Kariya (JP); Mitsuhiro Naito, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 18/147,315

(22) Filed: Dec. 28, 2022

(65) Prior Publication Data
US 2023/0251637 A1 Aug. 10, 2023

(30) Foreign Application Priority Data

Feb. 10, 2022 (JP) ................. 2022-019768

(51) Int. Cl.
*G05B 19/418* (2006.01)
(52) U.S. Cl.
CPC ................. *G05B 19/41865* (2013.01); *G05B 2219/31025* (2013.01)
(58) Field of Classification Search
CPC .... G05B 19/41865; G05B 2219/31025; G06Q 10/0631; G06Q 10/1093; G06Q 50/40; G06Q 10/02; G06Q 50/26; G06Q 10/04; G06Q 50/50
See application file for complete search history.

(56) References Cited

U.S. PATENT DOCUMENTS

| | | | |
|---|---|---|---|
| 2005/0171834 A1* | 8/2005 | Yokota | G06Q 10/00 705/7.22 |
| 2010/0185486 A1* | 7/2010 | Barker | G06Q 10/06 705/7.31 |
| 2017/0193627 A1* | 7/2017 | Urmson | G06Q 50/40 |
| 2017/0308842 A1* | 10/2017 | Tsuzuki | G06Q 10/063112 |
| 2017/0316697 A1* | 11/2017 | Tulabandhula | G08G 1/202 |
| 2018/0260787 A1* | 9/2018 | Xi | G06Q 10/1095 |
| 2019/0171988 A1* | 6/2019 | Kwatra | G06Q 50/40 |
| 2019/0265703 A1* | 8/2019 | Hicok | G06Q 10/02 |
| 2021/0199452 A1 | 7/2021 | Tanaka et al. | |

FOREIGN PATENT DOCUMENTS

| | | |
|---|---|---|
| JP | 2003-223552 A | 8/2003 |
| JP | 2021-103462 A | 7/2021 |
| KR | 10-2001-0094454 A | 11/2001 |

OTHER PUBLICATIONS

Jan. 27, 2025 English Translation of the Office Action issued in Korean Patent Application No. 10-2023-0003204.

* cited by examiner

*Primary Examiner* — Christopher E. Everett
(74) *Attorney, Agent, or Firm* — Oliff PLC

(57) ABSTRACT

A control device includes a control unit configured to acquire target data indicating a production target in a factory and detect production progress in the factory, compare the production target indicated by the acquired target data with the detected production progress, and predict, based on an obtained comparison result, a finishing time period within which one or more users working in the factory are expected to finish work and adjust, based on the predicted finishing time period, a time period within which one or more vehicles for commuting are expected to transport the one or more users.

15 Claims, 5 Drawing Sheets

CONTROL DEVICE, SYSTEM, AND ADJUSTMENT METHOD

CROSS-REFERENCE TO RELATED APPLICATION

This application claims priority to Japanese Patent Application No. 2022-019768 filed on Feb. 10, 2022, incorporated herein by reference in its entirety.

BACKGROUND

1. Technical Field

The present disclosure relates to a control device, a system, and an adjustment method.

2. Description of Related Art

Japanese Unexamined Patent Application Publication No. 2021-103462 (JP 2021-103462 A) discloses a device that estimates a time when a user is going out based on information acquired from a plurality of sensors and requests dispatch of a vehicle so that the vehicle arrives by the estimated time.

SUMMARY

If employees who commute to a factory by bus experience trouble in a production line involved and their finishing time is delayed, there is a possibility that the employees miss a pick-up bus or a bus operating at a late hour is overloaded.

The present disclosure allows a user who commutes to a factory on a vehicle such as a bus to ride on a pick-up vehicle even if the finishing time is delayed.

A control device according to the present disclosure includes a control unit configured to acquire target data indicating a production target in a factory and detect production progress in the factory, compare the production target indicated by the acquired target data with the detected production progress, and predict, based on an obtained comparison result, a finishing time period within which one or more users working in the factory are expected to finish work and adjust, based on the predicted finishing time period, a time period within which one or more vehicles for commuting are expected to transport the one or more users.

In the control device according to the present disclosure, the control unit may be configured to select the one or more vehicles from among two or more kinds of vehicles having different capacities depending on the number of users predicted to finish the work within the finishing time period.

In the control device according to the present disclosure, the control unit may be configured to adjust the number of the one or more vehicles depending on the number of users predicted to finish the work within the finishing time period.

In the control device according to the present disclosure, the control unit may be configured to estimate whether the production target is achievable within a first period based on the comparison result, when estimation is made that the production target is not achievable within the first period, predict a starting time period within which at least one user starts to work in the factory during a second period subsequent to the first period, and adjust, based on the predicted starting time period, a time period within which at least one vehicle for commuting during the second period is expected to transport the at least one user.

In the control device according to the present disclosure, the control unit may be configured to estimate whether a staff member to work in the factory is added based on the comparison result, and when estimation is made that the staff member is added, control dispatch of a commuting vehicle for the staff member.

In the control device according to the present disclosure, the control unit may be configured to acquire, as the target data, data indicating a target quantity of products to be produced in the factory within a certain period, detect, as the production progress, a quantity of the products produced in the factory during the period, and predict the finishing time period based on a remaining quantity obtained by subtracting the detected quantity from the target quantity.

In the control device according to the present disclosure, the control unit may be configured to acquire route data indicating an operation route preregistered for each user predicted to finish the work within the finishing time period, and select the one or more vehicles from among two or more vehicles having different operation routes depending on the operation route indicated by the acquired route data.

In the control device according to the present disclosure, the control unit may be configured to acquire schedule data indicating a scheduled departure time when a reserved vehicle for one of the users predicted to finish the work within the finishing time period is expected to depart from the factory, determine whether the one of the users is expected to arrive before the scheduled departure time indicated by the acquired schedule data, and when determination is made that the one of the users is expected not to arrive before the scheduled departure time, generate guidance data for prompting the one of the users to use the one or more vehicles, and output the generated guidance data.

In the control device according to the present disclosure, the control unit may be configured to acquire the target data and detect the production progress for each production line in the factory to predict the finishing time period.

The control device according to the present disclosure may further include a communication unit configured to communicate with one or more terminal devices held by the one or more users.

The control unit may be configured to generate notification data for notifying the one or more users about the adjusted time period, and transmit the generated notification data to the one or more terminal devices via the communication unit.

The control device according to the present disclosure may further include a communication unit configured to communicate with one or more terminal devices installed in the factory.

The control unit may be configured to generate notification data for notifying the one or more users about the adjusted time period, and transmit the generated notification data to the one or more terminal devices via the communication unit.

The control device according to the present disclosure may further include a communication unit configured to communicate with the one or more vehicles.

The control unit may be configured to cause, via the communication unit, the one or more vehicles to transport the one or more users within the adjusted time period.

A system according to the present disclosure includes
the control device described above, and
the one or more terminal devices.

A system according to the present disclosure includes
the control device described above, and
the one or more vehicles.

An adjustment method according to the present disclosure includes
acquiring, by a control unit, target data indicating a production target in a factory,
detecting, by the control unit, production progress in the factory,
comparing, by the control unit, the production target indicated by the acquired target data with the detected production progress,
predicting, by the control unit, a finishing time period within which one or more users working in the factory are expected to finish work based on an obtained comparison result, and
adjusting, by the control unit, a time period within which one or more vehicles for commuting are expected to transport the one or more users based on the predicted finishing time period.

The adjustment method according to the present disclosure may further include
selecting, by the control unit, the one or more vehicles from among two or more kinds of vehicles having different capacities depending on the number of users predicted to finish the work within the finishing time period.

The adjustment method according to the present disclosure may further include
adjusting, by the control unit, the number of the one or more vehicles depending on the number of users predicted to finish the work within the finishing time period.

The adjustment method according to the present disclosure may further include
estimating, by the control unit, whether the production target is achievable within a first period based on the comparison result,
predicting, by the control unit, when estimation is made that the production target is not achievable within the first period, a starting time period within which at least one user starts to work in the factory during a second period subsequent to the first period, and
adjusting, by the control unit, a time period within which at least one vehicle for commuting during the second period is expected to transport the at least one user based on the predicted starting time period.

The adjustment method according to the present disclosure may further include
estimating, by the control unit, whether a staff member to work in the factory is added based on the comparison result, and
controlling, by the control unit, when estimation is made that the staff member is added, dispatch of a commuting vehicle for the staff member.

According to the present disclosure, the user who commutes to the factory on the vehicle such as a bus can ride on the pick-up vehicle even if the finishing time is delayed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the drawings.

The same or corresponding parts are denoted by the same signs throughout the figures. In the present embodiment, description of the same or corresponding parts will be omitted or simplified as appropriate.

Figure 1:
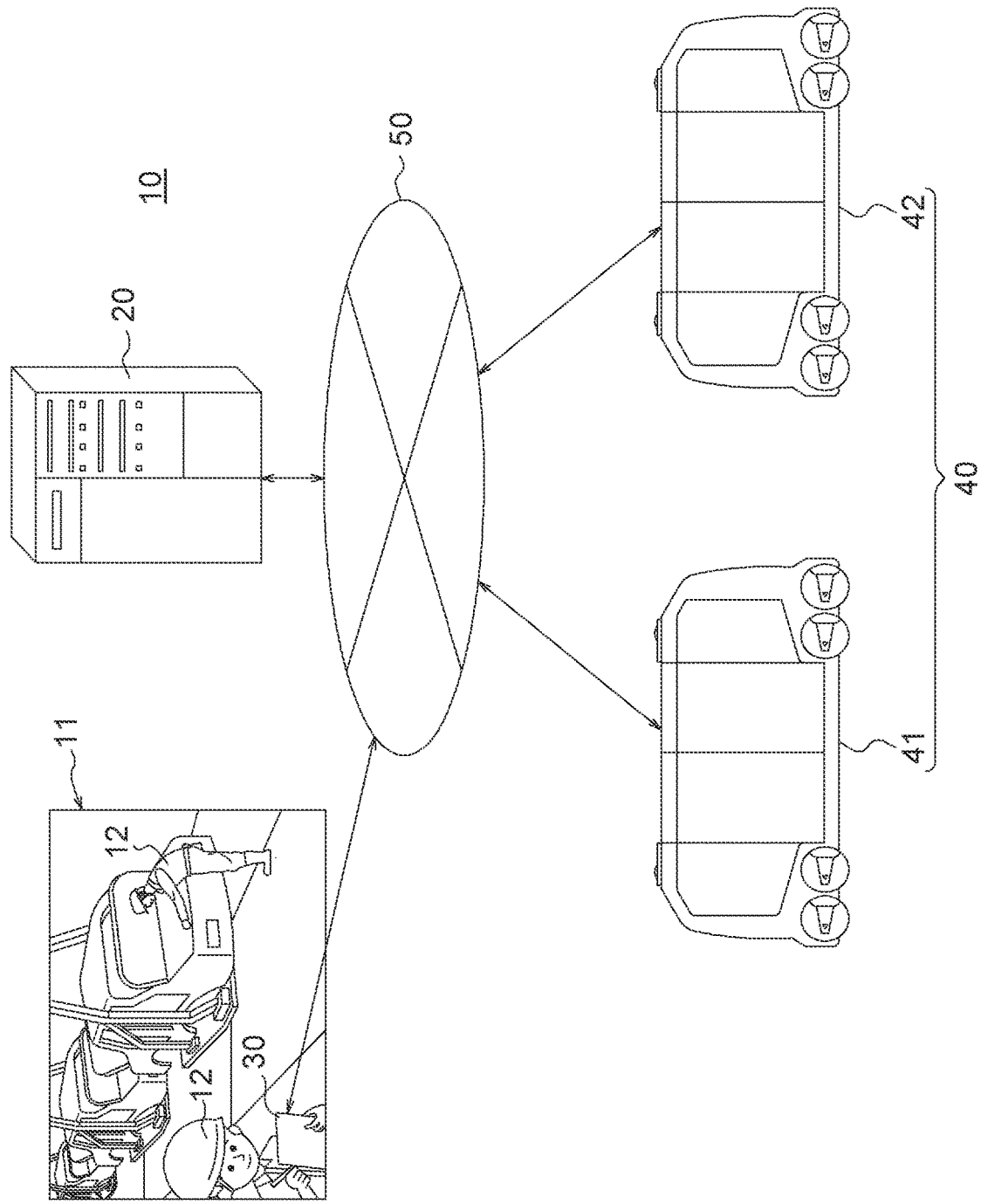
FIG. 1 is a diagram showing a configuration of a system according to an embodiment of the present disclosure.

The configuration of a system 10 according to the present embodiment will be described with reference to FIG. 1.

The system 10 according to the present embodiment includes a control device 20, one or more terminal devices 30, and a plurality of commuting vehicles 40 such as commuting buses. The control device 20 is capable of communicating with the terminal devices 30 and the vehicles 40 via a network 50.

The control device 20 is installed in a facility such as a data center. The control device 20 is a computer such as a server belonging to a cloud computing system or any other computing system.

The one or more terminal devices 30 are held by one or more users 12, or are installed in a factory 11 and used by the users 12. In the present embodiment, the terminal devices 30 held by two or more users 12 are used by the respective users 12. Each of the terminal devices 30 is a mobile device such as a mobile phone, a smartphone, or a tablet. Alternatively, the terminal device 30 installed in the factory 11 may be shared by two or more users 12. The terminal device 30 is, for example, a mobile device, a general-purpose device such as a PC, or a dedicated device in the factory 11. The term "PC" is an abbreviation for "personal computer".

Each vehicle 40 is any type of automobile such as a gasoline vehicle, a diesel vehicle, a hydrogen vehicle, an HEV, a PHEV, a BEV, or an FCEV. The term "HEV" is an abbreviation for "hybrid electric vehicle". The term "PHEV" is an abbreviation for "plug-in hybrid electric vehicle". The term "BEV" is an abbreviation for "battery electric vehicle". The term "FCEV" is an abbreviation for "fuel cell electric vehicle". Although each vehicle 40 is an AV in the present embodiment, the vehicle 40 may be driven by a driver or driving may be automated at any level. The term "AV" is an abbreviation for "autonomous vehicle". For example, the automation level is any one of Level 1 to Level 5 defined by SAE. The term "SAE" is an abbreviation for the "Society of Automotive Engineers". Each vehicle 40 may be a MaaS vehicle. The term "MaaS" is an abbreviation for "mobility as a service".

The network 50 includes the Internet, at least one WAN, at least one MAN, or any combination thereof. The term "WAN" is an abbreviation for "wide area network". The term "MAN" is an abbreviation for "metropolitan area network". The network 50 may include at least one wireless network, at least one optical network, or any combination thereof. Examples of the wireless network include an ad hoc network, a cellular network, a wireless LAN, a satellite communication network, or a terrestrial microwave network. The term "LAN" is an abbreviation for "local area network".

The outline of the present embodiment will be described with reference to FIG. 1.

The control device 20 acquires target data Dt indicating a production target in the factory 11, and detects production progress in the factory 11. The control device 20 compares the production target indicated by the acquired target data Dt with the detected production progress. The control device 20 predicts, based on the obtained comparison result, a finishing time period Tf within which one or more users 12 working in the factory 11 are expected to finish the work. The control device 20 adjusts, based on the predicted finishing time period Tf, a first time period T1 within which one or more first commuting vehicles 41 transport the users 12.

The finishing time period Tf may be predicted as a time range having a predetermined width, such as a range from 20:55 to 21:05, or may be predicted as a time including a predetermined allowance, such as a time around 21:00. The first time period T1 is set as a time range, such as a range from 21:10 to 21:30, from a time when the vehicle departs from a pick-up point in or near the site of the factory 11 to a time when the vehicle arrives at a drop-off point such as a station or a company dormitory.

According to the present embodiment, the users 12 who commute to the factory 11 on the vehicle 40 can ride on the first vehicle 41 that is a pick-up vehicle 40 even if the finishing time is delayed. For example, if employees who commute to the factory 11 by bus experience trouble in a production line involved and a delay in their finishing time is predicted, the bus operation schedule is adjusted to easily avoid such a situation that the employees miss a pick-up bus or a bus operating at a late hour is overloaded.

The vehicles 40 may include only vehicles having the same capacity. In the present embodiment, the vehicles 40 include two or more types of vehicles having different capacities. The control device 20 may select one or more first vehicles 41 from among the two or more types of vehicles depending on the number of users 12 predicted to finish the work within the finishing time period Tf, thereby easily avoiding such a situation that the first vehicles 41 are overloaded. For example, if many employees who commute to the factory 11 by bus experience trouble in a production line involved and a delay in their finishing time is predicted, the bus operating at a late hour is changed to a bus having a large capacity, thereby easily avoiding such a situation that the bus is overloaded.

The control device 20 may adjust the number of first vehicles 41 depending on the number of users 12 predicted to finish the work within the finishing time period Tf, thereby allowing all the users 12 to ride on the first vehicles 41. For example, if many employees who commute to the factory 11 by bus experience trouble in a production line involved and a delay in their finishing time is predicted, the number of buses operating at a late hour is increased. Thus, even if one or more buses are overloaded, the remaining employees can be allocated to another bus.

In the present embodiment, the control device 20 estimates whether the production target indicated by the target data Dt is achieved within a first period P1 based on a comparison result obtained by comparing the production target and the production progress. When the control device 20 estimates that the production target is not achieved within the first period P1, the control device 20 predicts a starting time period Ts within which at least one user 12 starts to work in the factory 11 during a second period P2 subsequent to the first period P1. The control device 20 adjusts, based on the predicted starting time period Ts, a second time period T2 within which at least one second commuting vehicle 42 for the second period P2 transports the user 12.

The starting time period Ts may be predicted as a time range having a predetermined width, such as a range from 7:25 to 7:35, or may be predicted as a time including a predetermined allowance, such as a time around 7:30. The second time period T2 is set as a time range, such as a range from 7:00 to 7:20, from a time when the vehicle departs from a pick-up point such as a station or a company dormitory to a time when the vehicle arrives at a drop-off point in or near the site of the factory 11.

According to the present embodiment, the users 12 who commute to the factory 11 on the vehicle 40 can ride on the second vehicle 42 that is a vehicle 40 for the factory 11 to arrive before the starting time even if the starting time is delayed. For example, if employees who commute to the factory 11 by bus experience trouble in a production line involved and fail to achieve the production target within the current day and their starting time is predicted to be earlier on the next day, the bus operation schedule on the next day is adjusted to easily avoid such a situation that the employees will be late for the starting time on the next day or a bus operating at an early hour on the next day will be overloaded.

Figure 2:
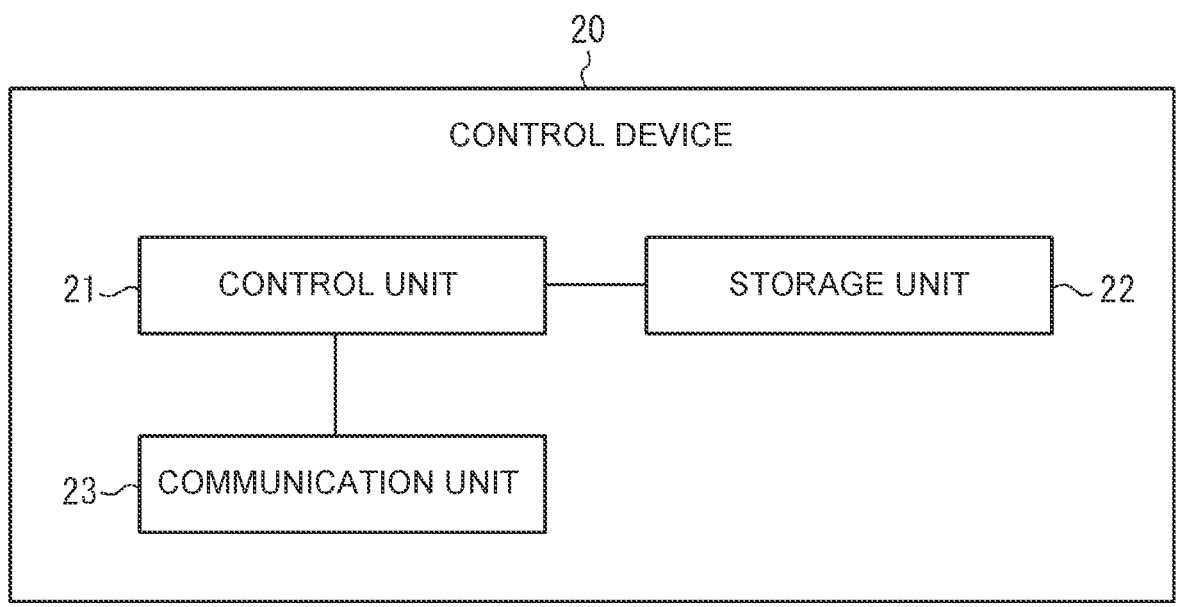
FIG. 2 is a block diagram illustrating a configuration of a control device according to the embodiment of the present disclosure.

The configuration of the control device 20 according to the present embodiment will be described with reference to FIG. 2.

The control device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a processor dedicated to specific processes. The term "CPU" is an abbreviation for "central processing unit". The term "GPU" is an abbreviation for "graphics processing unit". Examples of the programmable circuit include an FPGA. The term "FPGA" is an abbreviation for "field-programmable gate array". Examples of the dedicated circuit include an ASIC. The term "ASIC" is an abbreviation for "application specific integrated circuit". The control unit 21 executes processes related to an operation of the control device 20 while controlling each unit of the control device 20.

The storage unit 22 includes at least one semiconductor memory, at least one magnetic memory, at least one optical memory, or any combination thereof. Examples of the semiconductor memory include a RAM and a ROM. The term "RAM" is an abbreviation for "random access memory". The term "ROM" is an abbreviation for "read only memory". Examples of the RAM include an SRAM and a DRAM. The term "SRAM" is an abbreviation for "static random access memory". The term "DRAM" is an abbreviation for "dynamic random access memory". Examples of the ROM include an EEPROM. The term "EEPROM" is an abbreviation for "electrically erasable programmable read only memory". The storage unit 22 functions as, for example, a main storage device, an auxiliary storage device, or a cache memory. The storage unit 22 stores data to be used for the operation of the control device 20 and data obtained by the operation of the control device 20.

The communication unit 23 includes at least one communication interface. Examples of the communication interface include a LAN interface. The communication unit 23 communicates with the terminal devices 30 and the vehicles 40 including one or more first vehicles 41 and at least one second vehicle 42. The communication unit 23 receives the data to be used for the operation of the control device 20, and transmits the data obtained by the operation of the control device 20.

The functions of the control device 20 are implemented by executing a program according to the present embodiment with the processor serving as the control unit 21. That is, the functions of the control device 20 are implemented by software. The program causes the computer to perform the operation of the control device 20 such that the computer functions as the control device 20. That is, the computer functions as the control device 20 by performing the operation of the control device 20 in accordance with the program.

The program can be stored in a non-transitory computer-readable medium. Examples of the non-transitory computer-readable medium include a flash memory, a magnetic recording device, an optical disc, a magneto-optical recording medium, and a ROM. For example, the program is distributed by selling, transferring, or renting a portable medium storing the program, such as an SD card, a DVD, or a CD-ROM. The term "SD" is an abbreviation for "secure digital". The term "DVD" is an abbreviation for "digital versatile disc". The term "CD-ROM" is an abbreviation for "compact disc read only memory". The program may be distributed by storing the program in a storage of a server and transferring the program from the server to other computers. The program may be provided as a program product.

For example, the computer temporarily stores the program stored in the portable medium or the program transferred from the server in the main storage device. The computer then causes the processor to read the program stored in the main storage device, and causes the processor to execute processes in accordance with the read program. The computer may read the program directly from the portable medium and execute the processes in accordance with the program. The computer may execute the processes in accordance with the received program every time the program is transferred from the server to the computer. The processes may be executed by a so-called ASP service in which the functions are implemented only by execution instructions and result acquisition without transferring the program from the server to the computer. The term "ASP" is an abbreviation for "application service provider". The program includes information that is provided for processing by an electronic computer and equivalent to the program. For example, data that is not a direct command to the computer but has the property of defining the processing of the computer is the "information equivalent to the program".

A part or all of the functions of the control device 20 may be implemented by a programmable circuit or dedicated circuit that serves as the control unit 21. That is, a part or all of the functions of the control device 20 may be implemented by hardware.

Figure 3:
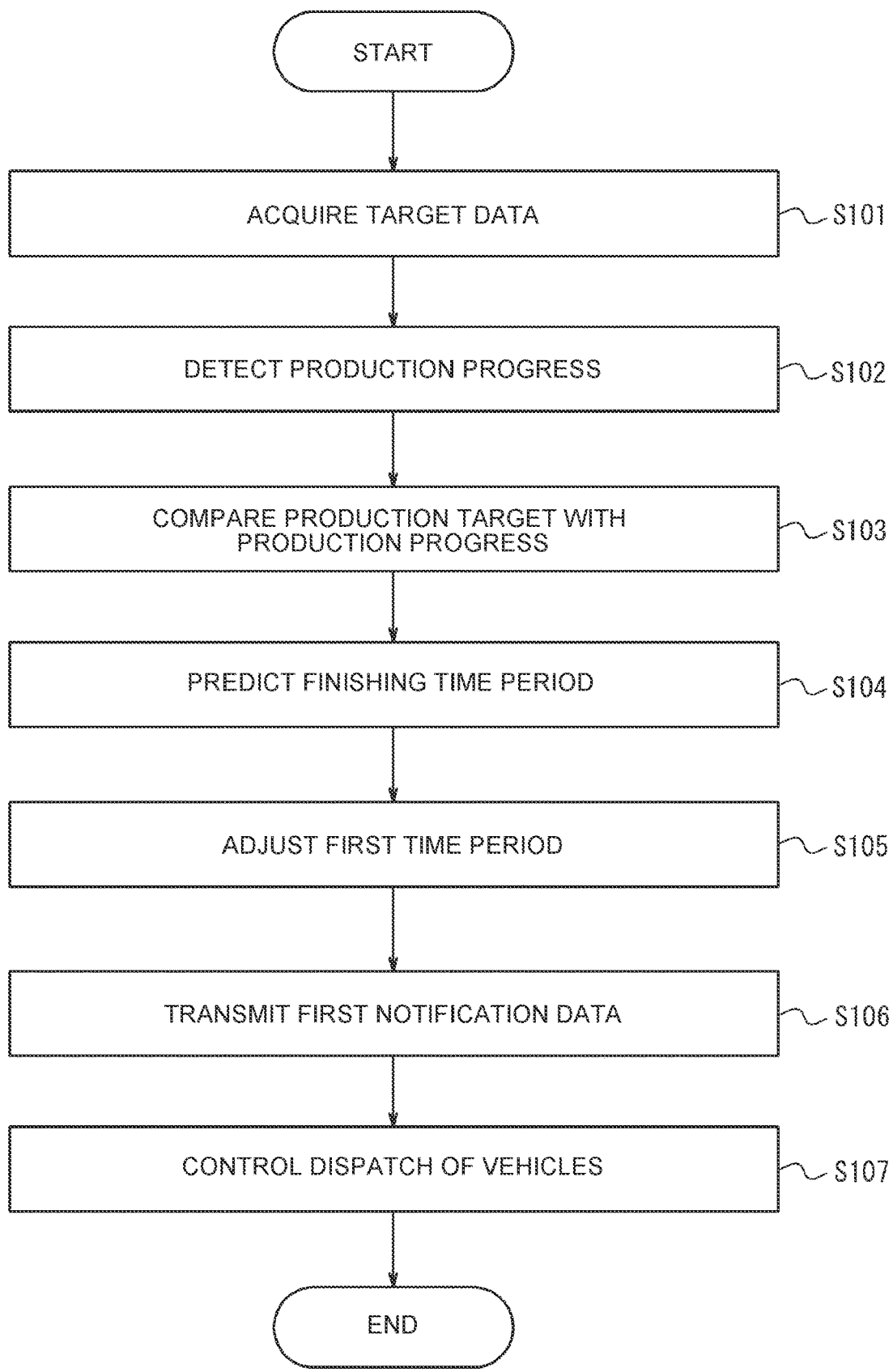
FIG. 3 is a flowchart showing an operation of the control device according to the embodiment of the present disclosure.

The operation of the control device 20 according to the present embodiment will be described with reference to FIG. 3. The operation corresponds to an adjustment method according to the present embodiment.

In Step S101, the control unit 21 of the control device 20 acquires target data Dt indicating a production target in the factory 11. In the present embodiment, the control unit 21 acquires the target data Dt for each production line in the factory 11. Any method may be used as a method for acquiring the target data Dt. The present embodiment uses a method of receiving the target data Dt from a system that manages production processes in the factory 11, such as a production management system, an ERP system, or an MES, via the communication unit 23. The term "ERP" is an abbreviation for "enterprise resource planning". The term "MES" is an abbreviation for "manufacturing execution system".

Specifically, the control unit 21 of the control device 20 acquires, as the target data Dt, data indicating a target quantity of products to be produced in the factory 11 within a certain period Px. For example, if the factory 11 is an automobile factory and the period Px is a current day, the control unit 21 acquires data indicating a target production quantity on the current day as the target data Dt for each production line.

In Step S102, the control unit 21 of the control device 20 detects production progress in the factory 11. In the present embodiment, the control unit 21 detects the production progress for each production line in the factory 11. Any method may be used as a method for detecting the production progress. The present embodiment uses a method of receiving data indicating the production progress from the system that manages production processes in the factory 11, such as the production management system, the ERP system, or the MES, via the communication unit 23. Alternatively, there may be used a method of detecting the production progress by receiving an image captured by a camera installed in the factory 11 via the communication unit 23 and analyzing the received image. As a method for image analysis, a known method can be used. Machine learning such as deep learning may be used.

Specifically, the control unit 21 of the control device 20 detects the quantity of products produced in the factory 11 during the period Px as the production progress. For example, if the factory 11 is an automobile factory and the period Px is a current day, the control unit 21 detects a currently produced quantity on the current day as the production progress for each production line.

In Step S103, the control unit 21 of the control device 20 compares the production target indicated by the target data Dt acquired in Step S101 with the production progress detected in Step S102. In the present embodiment, the control unit 21 compares the production target with the production progress for each production line in the factory 11.

Specifically, the control unit 21 of the control device 20 obtains the remaining quantity by subtracting the quantity detected in Step S102 from the target quantity indicated by the data acquired in Step S101. For example, if the factory 11 is an automobile factory and the period Px is a current day, the control unit 21 obtains the remaining quantity on the current day by subtracting a currently produced quantity on the current day from a target production quantity on the current day for each production line.

In Step S104, the control unit 21 of the control device 20 predicts a finishing time period Tf within which one or more users 12 working in the factory 11 are expected to finish the work based on the comparison result obtained in Step S103. In the present embodiment, the control unit 21 predicts the finishing time period Tf for each production line in the factory 11. Any method may be used as a method for predicting the finishing time period Tf. The present embodiment uses a method of obtaining the finishing time period Tf by estimating a period required to achieve the production target in view of the production progress and adding the estimated required period to a current time within a range in which overtime hours do not exceed an upper limit defined by laws and regulations. The required period may be estimated as a period range having a predetermined width, such as a range from 5 hours 55 minutes to 6 hours 05 minutes, or may be estimated as a period including a predetermined allowance, such as about 6 hours.

Specifically, the control unit 21 of the control device 20 predicts the finishing time period Tf based on the remaining quantity obtained in Step S103. For example, if the factory 11 is an automobile factory and the period Px is a current day, the control unit 21 obtains the finishing time period Tf for each production line by estimating a period required to produce the remaining quantity on the current day and adding the estimated period to a current time within a range in which overtime hours on the current day do not exceed the upper limit defined by the laws and regulations.

In Step S105, the control unit 21 of the control device 20 adjusts a first time period T1 within which one or more first commuting vehicles 41 transport the users 12 based on the finishing time period Tf predicted in Step S104. In the present embodiment, the control unit 21 sets the first time period T1 for each production line in the factory 11 by adding, to the finishing time period Tf, a short time margin such as a walking period from the building of the factory 11 to a pick-up point in or near the site of the factory 11. For example, the finishing time period Tf is predicted as a period from 20:55 to 21:05 on a current day for a production line in which 10 employees who commute to the factory 11 by bus are working. Assuming that the walking period to a pick-up point is 5 minutes and the bus operation period from the pick-up point to a drop-off point such as a station or a company dormitory is 20 minutes, the control unit 21 sets the first time period T1 to a period from 21:10 to 21:30 for a bus for transporting the 10 employees. That is, the control unit 21 sets 21:10 as a time when the bus departs from the pick-up point, and 21:30 as a time when the bus arrives at the drop-off point.

The control unit 21 of the control device 20 may select one or more first vehicles 41 from among two or more types of vehicles 40 having different capacities depending on the number of users 12 predicted to finish the work within the finishing time period Tf. For example, assuming that the first time period T1 is set to the period from 21:10 to 21:30 for the bus for transporting the 10 employees working in the same production line, the control unit 21 selects a bus that can accommodate 10 or more persons as the bus expected to wait at the pick-up point at 21:10.

The control unit 21 of the control device 20 may adjust the number of the first vehicles 41 depending on the number of users 12 predicted to finish the work within the finishing time period Tf. For example, it is assumed that the first time period T1 is set to the period from 21:10 to 21:30 for the bus for transporting the 10 employees working in the same production line. If there are only buses that can accommodate less than 10 persons, the control unit 21 selects two or more buses that can accommodate 10 or more persons in total as the buses expected to wait at the pick-up point at 21:10.

The vehicles 40 may include two or more vehicles 40 having different operation routes. In such a modification, the control unit 21 of the control device 20 acquires route data Dr indicating an operation route preregistered for each user 12 predicted to finish the work within the finishing time period Tf. Any method may be used as a method for acquiring the route data Dr. The present modification uses a method of reading data prestored in the storage unit 22 as the route data Dr. The control unit 21 selects one or more first vehicles 41 from among the two or more vehicles 40 depending on the operation route indicated by the acquired route data Dr. For example, it is assumed that the first time period T1 is set to the period from 21:10 to 21:30 for the bus for transporting the employees working in the same production line. Assuming that an operation route to the station is preregistered for five employees out of the 10 employees and an operation route to the company dormitory is preregistered for the remaining five employees, the control unit 21 selects a bus for the station and a bus for the company dormitory as the buses expected to wait at the pick-up point at 21:10.

In Step S106, the control unit 21 of the control device 20 generates first notification data D1 for notifying the users 12 about the first time period T1 adjusted in Step S105. The control unit 21 transmits the generated first notification data D1 to one or more terminal devices 30 via the communication unit 23. In the present embodiment, the control unit 21 transmits, as the first notification data D1, data for notifying two or more users 12 about the first time period T1 to the terminal devices 30 held by the respective users 12. When the first notification data D1 is received, each terminal device 30 notifies the corresponding user 12 about the first time period T1 by displaying the first notification data D1 on a display or outputting voice or sound from a speaker. Alternatively, the control unit 21 may transmit, as the first notification data D1, data for notifying two or more users 12 about the first time period T1 to the terminal device 30 installed in the factory 11. When the first notification data D1 is received, the terminal device 30 may notify the two or more users 12 about the first time period T1 by displaying the first notification data D1 on the display or outputting voice or sound from the speaker.

In Step S107, the control unit 21 of the control device 20 controls dispatch of one or more first vehicles 41. Specifically, the control unit 21 causes, via the communication unit 23, one or more first vehicles 41 to transport the users 12 within the first time period T1 adjusted in Step S105. In the present embodiment, the first vehicles 41 transport the users 12 by being autonomously driven in response to commands from the control device 20, but may transport the users 12 by notifying the drivers about commands and manually driving the first vehicles 41 by the drivers in response to the commands.

According to the present embodiment, when overtime work is predicted because the target of the production line cannot be achieved by the regular time, the pick-up time of the bus can be delayed automatically. When the start of work on the next day is predicted to be earlier because the target of the production line cannot be achieved within the current day, the transportation time of the bus can automatically be made earlier on the next day.

As a modification of the present embodiment, the control unit 21 of the control device 20 may estimate whether any staff member to work in the factory 11 is added based on the comparison result obtained in Step S103. In the present modification, when the control unit 21 estimates that the staff member is added, the control unit 21 controls the dispatch of a commuting vehicle for this staff member. For example, if the factory 11 is an automobile factory, the control unit 21 estimates a period required to produce the remaining quantity on the current day for each production line, and estimates that any staff member is added when the estimated period exceeds a threshold. The control unit 21 selects a vehicle for transporting the staff member from among the vehicles 40 for the production line in which the addition of the staff member is estimated. The control unit 21 causes, via the communication unit 23, the selected vehicle to transport the staff member.

According to the present modification, when addition of any staff member is predicted due to a delay in the progress of the production line, the pick-up bus for the additional staff member can be dispatched automatically.

Figure 4:
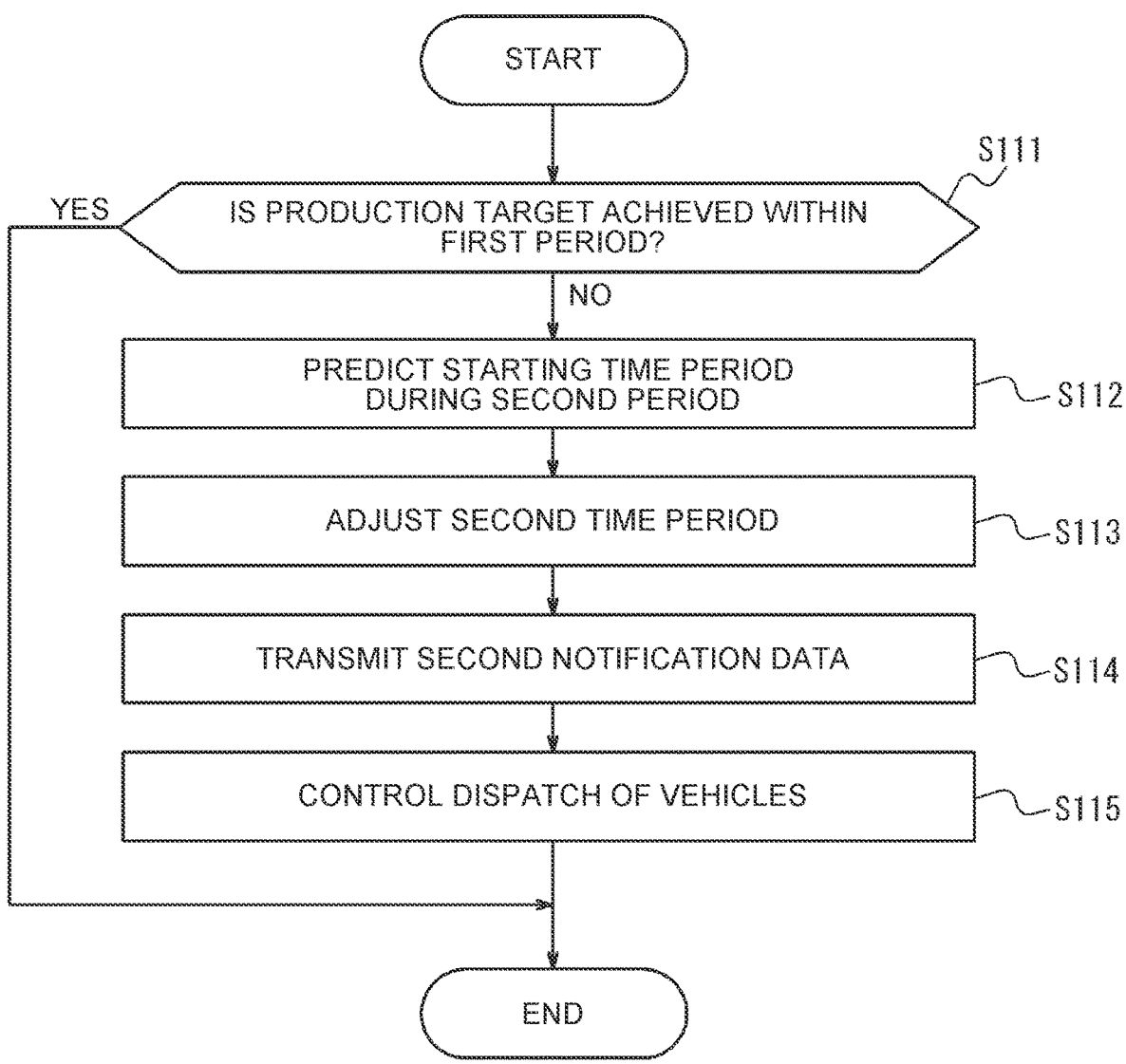
FIG. 4 is a flowchart showing another operation of the control device according to the embodiment of the present disclosure.

Another operation of the control device 20 according to the present embodiment will be described with reference to FIG. 4. This operation also corresponds to the adjustment method according to the present embodiment.

In Step S111, the control unit 21 of the control device 20 estimates whether the production target is achieved within the first period P1 based on the comparison result obtained in Step S103. In the present embodiment, the control unit 21 estimates whether the production target is achieved within the first period P1 for each production line in the factory 11. Any method may be used as a method for estimating whether the production target is achieved within the first period P1. The present embodiment uses a method of estimating a period required to achieve the production target in view of the production progress as in Step S104 and determining whether the estimated required period can be secured within the first period P1 while keeping overtime hours below the upper limit defined by the laws and regulations.

Specifically, the control unit 21 of the control device 20 estimates whether the production of the target quantity is completed within the first period P1 based on the remaining quantity obtained in Step S103. For example, if the factory 11 is an automobile factory and the first period P1 is a current day, the control unit 21 estimates a period required to produce the remaining quantity on the current day for each production line, and determines whether the estimated period can be secured within the current day while keeping overtime hours on the current day below the upper limit defined by the laws and regulations.

When the control unit 21 estimates that the production target is not achieved within the first period P1, a process of Step S112 is executed. When the control unit 21 estimates that the production target is achieved within the first period P1, the operation shown in FIG. 4 is terminated.

In Step S112, the control unit 21 of the control device 20 predicts a starting time period Ts within which at least one user 12 starts to work in the factory 11 during a second period P2 subsequent to the first period P1. In the present embodiment, the control unit 21 predicts the starting time period Ts for the production line in which estimation is made in Step S111 that the production target is not achieved within the first period P1. Any method may be used as a method for predicting the starting time period Ts. The present embodiment uses a method of obtaining the starting time period Ts by subtracting, from a reference starting time, a difference between the required period estimated in Step S111 and a period that can actually be secured within the first period P1.

Specifically, the control unit 21 of the control device 20 obtains a quantity of products for which production is deferred to the second period P2 by subtracting the quantity of products that can be produced within the first period P1 from the remaining quantity obtained in Step S103. The control unit 21 predicts the starting time period Ts based on the obtained quantity. For example, if the factory 11 is an automobile factory, the first period P1 is a current day, and the second period P2 is the next day, the control unit 21 obtains an additional quantity on the next day by subtracting a currently producible quantity on the current day from the remaining quantity on the current day for the production line in which determination is made in Step S111 that the estimated period cannot be secured within the current day. The control unit 21 obtains the starting time period Ts by estimating a period required to produce the additional quantity on the next day and subtracting the estimated period from the reference starting time.

In Step S113, the control unit 21 of the control device 20 adjusts a second time period T2 within which at least one second commuting vehicle 42 for the second period P2 transports the user 12 based on the starting time period Ts predicted in Step S112. In the present embodiment, the control unit 21 sets the second time period T2 by subtracting, from the starting time period Ts, a short time margin such as a walking period from a drop-off point in or near the site of the factory 11 to the building of the factory 11 for the production line in which estimation is made in Step S111 that the production target is not achieved within the first period P1. For example, the starting time period Ts is predicted as a period from 7:25 to 7:35 on the next day for a production line in which 10 employees who commute to the factory 11 by bus are working. Assuming that the bus operation period from the pick-up point such as the station or the company dormitory to the drop-off point is 20 minutes and the walking period from the drop-off point is 5 minutes, the control unit 21 sets the second time period T2 to a period from 7:00 to 7:20 for a bus for transporting the 10 employees. That is, the control unit 21 sets 7:00 as a time when the bus departs from the pick-up point, and 7:20 as a time when the bus arrives at the drop-off point.

In Step S114, the control unit 21 of the control device 20 generates second notification data D2 for notifying the user 12 about the second time period T2 adjusted in Step S113. The control unit 21 transmits the generated second notification data D2 to at least one terminal device 30 via the communication unit 23. In the present embodiment, the control unit 21 transmits, as the second notification data D2, data for notifying at least one user 12 about the second time period T2 to the terminal device 30 held by the user 12. Alternatively, the control unit 21 may transmit, as the second notification data D2, data for notifying at least one user 12 about the second time period T2 to the terminal device 30 installed in the factory 11. When the second notification data D2 is received, the terminal device 30 notifies the at least one user 12 about the second time period T2 by displaying the second notification data D2 on the display or outputting voice or sound from the speaker.

In Step S115, the control unit 21 of the control device 20 controls dispatch of at least one second vehicle 42. Specifically, the control unit 21 causes, via the communication unit 23, at least one second vehicle 42 to transport the user 12 within the second time period T2 adjusted in Step S113. In the present embodiment, the second vehicle 42 transports the user 12 by being autonomously driven in response to a command from the control device 20, but may transport the user 12 by notifying the driver about a command and manually driving the second vehicle 42 by the driver in response to the command.

Figure 5:
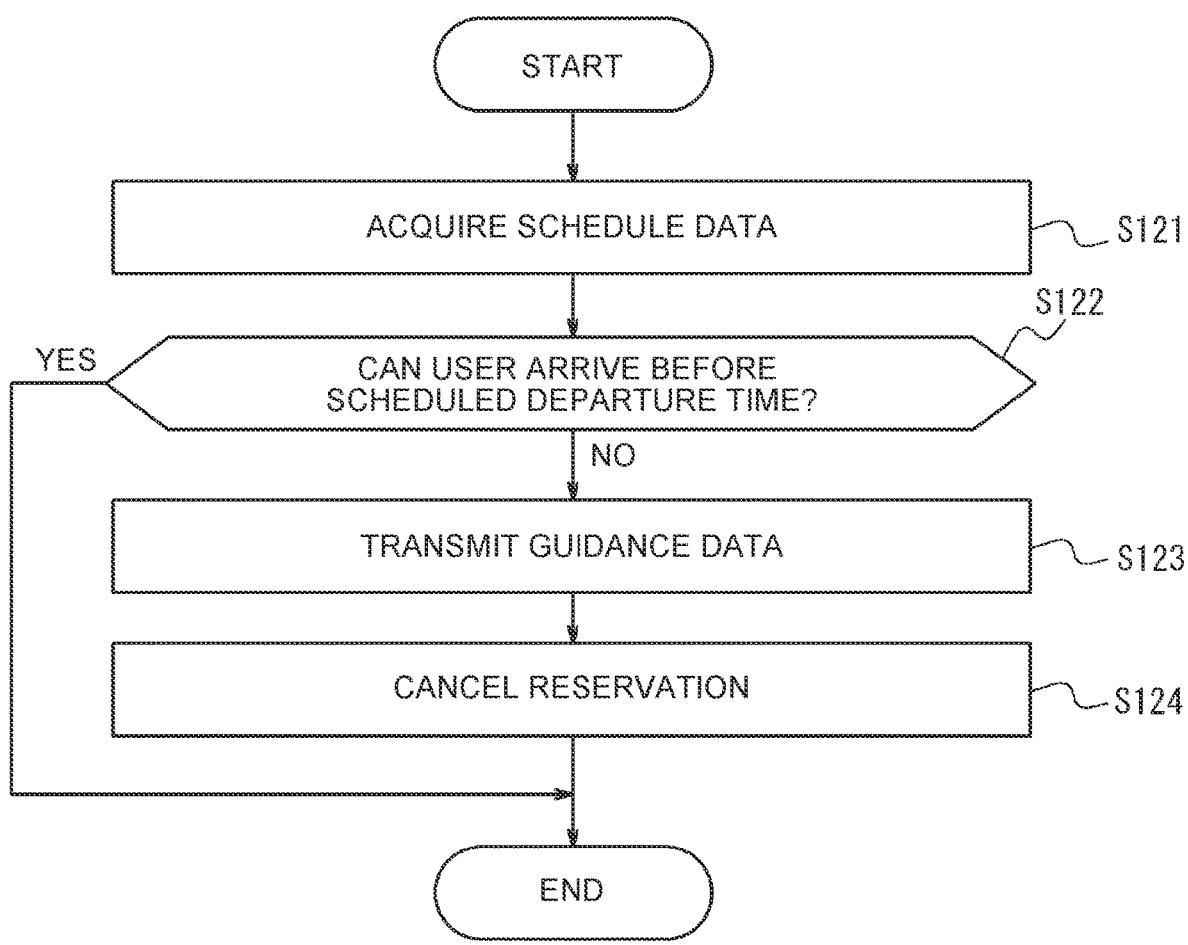
FIG. 5 is a flowchart showing still another operation of the control device according to the embodiment of the present disclosure.

Still another operation of the control device 20 according to the present embodiment will be described with reference to FIG. 5. This operation also corresponds to the adjustment method according to the present embodiment.

In Step S121, the control unit 21 of the control device 20 acquires schedule data Ds indicating a scheduled departure time Tr when a reserved vehicle Vr for a user Ur who is one of the users 12 predicted to finish the work within the finishing time period Tf departs from the factory 11. Specifically, the control unit 21 receives the schedule data Ds from a system that manages reservations for the vehicles 40 via the communication unit 23.

In Step S122, the control unit 21 of the control device 20 determines whether the user Ur can arrive before the scheduled departure time Tr indicated by the schedule data Ds acquired in Step S121. Specifically, the control unit 21 calculates a time when the user Ur can arrive at the pick-up point by adding, to the finishing time period Tf, a short time margin such as a walking period from the building of the factory 11 to the pick-up point in or near the site of the factory 11. When the calculated time is equal to or earlier than the scheduled departure time Tr, the control unit 21 determines that the user Ur can arrive before the scheduled departure time Tr. In this case, the operation shown in FIG. 5 is terminated. The operation shown in FIG. 5 may be performed after Step S104 and before Step S105. When determination is made that the user Ur can arrive before the scheduled departure time Tr, the processes from Step S105 to Step S107 need not be executed for the user Ur. When the calculated time is later than the scheduled departure time Tr, the control unit 21 determines that the user Ur cannot arrive before the scheduled departure time Tr. In this case, a process of Step S123 is executed.

In Step S123, the control unit 21 of the control device 20 generates guidance data Dg for prompting the user Ur to use the first vehicle 41. The control unit 21 outputs the generated guidance data Dg. Specifically, the control unit 21 contains the guidance data Dg in the first notification data D1 when transmitting, as the first notification data D1, data for notifying the user Ur about the first time period T1 to the terminal device held by the user Ur. That is, the process of Step S123 is executed as a part of the process of Step S106 for the user Ur.

In Step S124, the control unit 21 of the control device 20 executes a process of canceling the reservation for the vehicle Vr. The control unit 21 need not execute this process until the start of overtime work of the user Ur is detected or the remaining period before the scheduled departure time Tr falls below a threshold. Whether the user Ur has started overtime work can be determined, for example, from an operation status after the regular time of the corresponding production line.

According to the present embodiment, even when the user Ur cannot cancel the reservation for the bus by himself/herself due to overtime work, the reservation can automatically be canceled by predicting the occurrence of the overtime work or detecting the start of the overtime work.

The present disclosure is not limited to the embodiment described above. For example, two or more blocks in the block diagram may be integrated, or a single block may be divided apart. Two or more steps in the flowchart may be executed in parallel or in different order as necessary or based on processing capacities of devices that execute the steps, instead of being executed in time series in accordance with description. Other modifications may be made without departing from the gist of the present disclosure.

What is claimed is:

1. A control device comprising:
   a communication unit configured to communicate with terminal devices, vehicles, and a production control system that manages a production process of a factory; and
   a control unit comprising a processor programmed to:
   acquire, via the communication unit, target data indicating a target quantity of products to be produced in the factory within a predefined period of time from the production control system; and
   detect a quantity of the products produced in the factory during the predefined period of time by:
      acquiring data indicating the quantity of the products produced in the factory during the predefined period of time from the production control system via the communication unit; or
      detecting the quantity of the products produced in the factory by acquiring an image captured by a camera installed in the factory via the communication unit and analyzing the acquired image;
   calculate a remaining quantity of the products by subtracting the detected quantity from the target quantity indicated by the acquired target data;
   predict, based on the calculated remaining quantity, a finishing time period within which one or more users working in the factory are expected to finish work;
   adjust a time period within which one or more vehicles for commuting are expected to transport the one or more users based on the predicted finishing time period;
   transmit, via the communication unit, notification data to one or more terminal devices respectively associated with the one or more users notifying the one or more users of the adjusted time period; and
   notify, via the communication unit, the one or more vehicles or drivers of the one or more vehicles of a command to cause the one or more vehicles to transport the one or more users in a time period adjusted according to the predicted finishing time period.

2. The control device according to claim 1, wherein the processor is programmed to select the one or more vehicles from among two or more kinds of vehicles having different capacities depending on the number of users predicted to finish the work within the predicted finishing time period.

3. The control device according to claim 1, wherein the processor is programmed to adjust the number of the one or more vehicles depending on the number of users predicted to finish the work within the predicted finishing time period.

4. The control device according to claim 1, wherein the processor is programmed to:
   estimate whether the production target is achievable within a first period based on the predicted finishing time period;
   when estimation is made that the production target is not achievable within the first period, predict a starting time period within which at least one user starts to work in the factory during a second period subsequent to the first period; and
   adjust, based on the predicted starting time period, a time period within which at least one vehicle for commuting during the second period is expected to transport the at least one user.

5. The control device according to claim 1, wherein the processor is programmed to:

estimate whether a staff member to work in the factory is to added based on the predicted finishing time period; and when estimation is made that the staff member is to be added, control dispatch of a commuting vehicle for the staff member to be added.

6. The control device according to claim 1, wherein the processor is programmed to:
acquire, via the communication unit, route data indicating an operation route preregistered for each user predicted to finish the work within the predicted finishing time period; and
select the one or more vehicles from among two or more vehicles having different operation routes depending on the operation route indicated by the acquired route data.

7. The control device according to claim 1, wherein the processor is programmed to:
acquire, via the communication unit, schedule data indicating a scheduled departure time when a reserved vehicle for one of the users predicted to finish the work within the predicted finishing time period is expected to depart from the factory;
determine whether the one of the users is expected to arrive before the scheduled departure time indicated by the acquired schedule data; and
when determination is made that the one of the users is expected not to arrive before the scheduled departure time, generate guidance data for prompting the one of the users to use the one or more vehicles, and transmit the generated guidance data to a terminal device associated with the one of the users via the communication unit.

8. The control device according to claim 1, wherein the processor is programmed to acquire the target data and detect the quantity of products produced for each production line in the factory to predict the finishing time period.

9. A system comprising:
the control device according to claim 1; and
the one or more terminal devices.

10. The control device according to claim 1, wherein the processor is programmed to:
determine if a user will work beyond the predicted finishing time period because the user has started overtime work or the user cannot arrive before a scheduled departure time; and
if it is determined that the user will work beyond the predicted finishing time period, cancel a reservation to transport the user.

11. An adjustment method implemented by a control unit including a communication unit configured to communicate with terminal devices, vehicles, and a production control system that manages a production process of a factory, and a control unit comprising a processor, the adjustment method comprising:
acquiring, by the communication unit, target data indicating a target quantity of products to be produced in the factory within a predefined period of time from the production control system;
detecting, by the processor, a quantity of the products produced in the factory during the predefined period of time by:
acquiring data indicating the quantity of the products produced in the factory during the predefined period of time from the production control system via the communication unit; or
detecting the quantity of the products produced in the factory by acquiring an image captured by a camera installed in the factory via the communication unit and analyzing the acquired image;
predicting, by the processor, based on the calculated remaining quantity, a finishing time period within which one or more users working in the factory are expected to finish work;
adjusting, by the processor, a time period within which one or more vehicles for commuting are expected to transport the one or more users based on the predicted finishing time period;
transmitting, via the communication unit, notification data to one or more terminal devices respectively associated with the one or more users notifying the one or more users of the adjusted time period; and
notifying, via the communication unit, the one or more vehicles or drivers of the one or more vehicles of a command to cause the one or more vehicles to transport the one or more users in a time period adjusted according to the predicted finishing time period.

12. The adjustment method according to claim 11, further comprising selecting, by the processor, the one or more vehicles from among two or more kinds of vehicles having different capacities depending on the number of users predicted to finish the work within the predicted finishing time period.

13. The adjustment method according to claim 11, further comprising adjusting, by the processor, the number of the one or more vehicles depending on the number of users predicted to finish the work within the predicted finishing time period.

14. The adjustment method according to claim 11, further comprising:
estimating, by the processor, whether the production target is achievable within a first period based on the predicted finishing time period;
predicting, by the processor, when estimation is made that the production target is not achievable within the first period, a starting time period within which at least one user starts to work in the factory during a second period subsequent to the first period; and
adjusting, by the processor, a time period within which at least one vehicle for commuting during the second period is expected to transport the at least one user based on the predicted starting time period.

15. The adjustment method according to claim 11, further comprising:
estimating, by the processor, whether a staff member to work in the factory is to be added based on the predicted finishing time period; and
controlling, by the processor, when estimation is made that the staff member is to be added, dispatch of a commuting vehicle for the staff member.

* * * * *